July 28, 1970　　　　L. J. HEIDT　　　　3,522,183
SOLID DIELECTRIC POLYOLEFIN COMPOSITIONS
CONTAINING VARIOUS VOLTAGE STABILIZERS
Filed May 7, 1968　　　　　　　　　　　　2 Sheets-Sheet 1

INVENTOR.
LAWRENCE J. HEIDT
BY
McLean and Boustead
ATTORNEYS

*INVENTOR.*
LAWRENCE J. HEIDT

BY
*McLean and Boustead*
ATTORNEYS

3,522,183
SOLID DIELECTRIC POLYOLEFIN COMPOSITIONS CONTAINING VARIOUS VOLTAGE STABILIZERS

Lawrence J. Heidt, Arlington, Mass., assignor to Simplex Wire and Cable Company, Cambridge, Mass., a corporation of Massachusetts
Continuation-in-part of application Ser. No. 372,301, June 3, 1964. This application May 7, 1968, Ser. No. 732,486
Int. Cl. C08f *45/60;* H01b *3/18, 3/24*
U.S. Cl. 252—63.7
26 Claims

ABSTRACT OF THE DISCLOSURE

A solid dielectric composition is disclosed comprising a major amount of solid-phase polymer of polyethylene, polypropylene or polyisobutylene having dispersed therein a small, soluble voltage stabilizing amount from about 0.1 to about 10 percent of a voltage stabilizing additive. The voltage stabilizing additives include 2,4,6 - trinitrotoluene; 2,4-dinitrotoluene; 2,6-dinitrotoluene; 2-nitrodiphenylamine; 2,4 - dinitrodiphenylamine; o-nitroanisole; o-nitrobiphenyl; 2-nitroaniline; anthranilonitrile; 1-fluoro-2 - nitrobenzene; chloranil; 2,6 - dinitroaniline; diparamethoxy diphenylamine; o-nitrotoluene; N-nitroso, N-phenyl, benzylamine; N-nitroso carbazole; N-nitroso diphenylamine; azobenzene; 4-methyl-2 - nitroaniline; p-phenyl azoaniline; ω-nitro styrene; 2,2′-dinitro biphenyl and mixtures thereof, mixtures thereof with diphenylamine; phenyl alpha-naphthylamine; phenyl-beta-naphthylamine; N,N′-diphenyl paraphenylene diamine or benzidene and mixtures of any of the above with m-dinitrobenzene; m-nitroaniline; p-nitroaniline; m-nitrotoluene; p-nitrotoluene; o-nitrochlorobenzene or p-nitrochlorobenzene.

CROSS REFERENCES TO RELATED APPLICATIONS

This application is a continuation-in-part of my copending application Ser. No. 372,301, filed June 3, 1964, now abandoned.

BACKGROUND OF THE INVENTION

Field of the invention

This invention relates to electric insulating materials of great dielectric strength for use at high voltages such as in the order of kilovolts, and more particularly to polyolefin, e.g., polyethylene, solid dielectrics of improved voltage stability for use as insulation in power cables.

DESCRIPTION OF THE PRIOR ART

In the recent past, synthetic high-polymers have found increasing application as insulating materials in various electrical arts. In particular, olefin polymers, chiefly the polyethylenes and polypropylene, for example, are generally suitable as insulating materials for electric cables and wires due to their good mechanical properties and workability in conjunction with excellent electrical properties. For high-voltage purposes, however, the use of such substances has been possible only within narrow limits because their theoretical electrical breakdown strength in practice is not even approached.

It has been theorized that the relative weakness of commercially prepared polyolefin insulation results from the many small flaws and air spaces formed during manufacture which are virtually impossible to prevent in commercial manufacturing processes. For example, small particles of foreign matter will always be present in the hydrocarbon matrix. Careful examination of many test failures has now revealed that these small flaws often initiate the growth of a fault in the insulation, with the actual growth of the fault, which results in failure, being due to electron avalanches derived from the current in the cable which produce ionization and subsequent failure at the flaw. A method of reducing the ability of foreign matter to initiate faults, i.e., a method to delay or prevent the occurrence of such electron avalanches, would obviously result in an overall increase in electrical breakdown strength.

SUMMARY OF THE INVENTION

It has now been surprisingly discovered that certain chemicals and their combinations are voltage stabilizers in polyolefins and offer a considerable degree of protection from the effects of small imperfections in the insulation when added to the polyolefin, e.g., polyethylene, insulation. These additives are thought to function through their capability to absorb energetic electrons, and thereby prevent or delay the occurrence of the electron avalanches that lead to electrical failure of polyolefin insulation. The additives of the invention are believed slowly to return to their original state by releasing the absorbed electrons at a lower energy level and dissipating the absorbed energy to the matrix as heat, whereupon they are again capable of stopping or absorbing other energetic electrons and repeating the cycle of stabilizing action.

The preferred voltage stabilizing additives are, of course, those materials which prevent failure up to the very highest applied voltages. Materials which are both effective stabilizers and also readily available in commerce are most desirable. In accordance with the present invention it is postulated that effective additives have in common the following features:

(1) An electron acceptor group, especially a strongly unsaturated radical, e.g., one containing a $\pi$ bond, such as $-NO_2$, $>CO$, $-CN$, phenyl and polycyclic aromatics.

(2) An electron donor group, especially one containing a transferable proton such as amino and lower, i.e., up to eight carbon atoms, alkyl radicals, e.g., $-NH_2$ and $-CH_3$.

(3) Potential hydrogen bonding between the acceptor and donor group by a transferable proton, such as when the acceptor and donor groups are ortho with respect to one another, e.g., on a benzene ring.

(4) Reversibility of the proton transfer between the acceptor and donor groups, such as in the keto-enol isomerization.

(5) The structure and bonds between the acceptor and donor groups which favor transfer of charge and energy, such as a planar or near planar structure of a conjugated system of alternating single and double bonds, e.g., an aromatic ring structure.

(6) Adequate size and complexity of the conjugated system to provide for electron capture and subsequent energy dissipation without producing irreversible bond rupture.

(7) Adequate solubility of the additive in the insulating material to provide a sufficient number of centers for the capture of objectionable contaminants such as oxygen and of the electrons moving in the electric field.

Generally speaking the relative electron affinities of the atomic residues are in the order of Cl being greater than O. O is in turn greater than N which in turn is greater than C. The acceptor groups have electron affinities in the order of —NO₂ being greater than —CN which is greater than >C=O, in turn greater than phenyl. The relative electron donor strengths of groups such as —N(CH₃)₂ are greater than —NH₂ which is greater than —CH₃, in turn greater than phenyl. The Hammett sigma and sigma plus values are a rough measure of the relative electron acceptor and donor properties of the atoms and groups. These sigma values have been determined and tabulated by many people, especially P. R. Wells, Chemical Reviews, pp. 171–219, April 1963; see the tables on pp. 181 and 189 of this article.

Effective voltage stabilizers in accordance with the present invention include such aromatic hydrocarbons as 2,4,6-trinitrotoluene; 2-nitrodiphenylamine; 2,4-dinitrodiphenylamine; o-nitroanisole; 2,6-dinitrotoluene; 2,4-dinitrotoluene; o-nitrobiphenyl; 2-nitroaniline; anthranilonitrile; 1-fluoro-2-nitrobenzene; diparamethoxy diphenylamine; o-nitrotoluene; chloranil; 2,6-dinitroaniline; N-nitroso, N-phenyl, benzylamine; N-nitroso carbazole; N-nitroso diphenylamine; azobenzene; 4-methyl-2-nitroaniline; p-phenyl azoaniline; ω-nitro styrene; and 2,2'-dinitro biphenyl, mixtures thereof, and mixtures thereof with one or more of diphenylamine, phenyl-alpha-naphthalamine; phenyl-beta-naphthalamine, N,N' - diphenyl paraphenylene diamine and benzidene. All of the above materials produce the desired effect, some to a greater degree than others.

The additives of the present invention are particularly effective with polyolefins such as low density polyethylene based compositions which generally have a density on the order of 0.92 to about 0.95 and a melt index between 0.2 and 2.0. Specifically, the polyethylenes to which we refer are those solid polymers of ethylene prepared by the "high pressure" process. Hereinafter the invention will be described with reference to such polyethylene; however, the present invention is not to be considered as limited to use with such polyethylene since the additives are also effective for the desired purpose in high density (low pressure) polyethylenes and in other polyolefins, e.g., polypropylene, although the last material because of its lack of flexibility is not generally useful for cable insulation. The polyethylene compositions stabilized in accordance with the present invention can, of course, contain minor amounts of the usual additives, adjuvants and fillers conventionally employed in polyethylene compositions, such as carbon black, pigments, anti-oxidants, heat stabilizers and ozone resistance stabilizers. The additives of the present invention are also useful in increasing the voltage stability of polyethylene compositions over a long period of time where the polyethylene compositions contain minor amounts of rubbery polymers and copolymers of such olefins as isobutylene and isoprene. Additionally, the additives can be used with polyethylene compositions which have been cross-linked, using, for example, a peroxide catalyst, e.g., dicumyl peroxide, 2,5-bis(tertiary-butylperoxy) 2,5-dimethyl hexane, 2,5-dimethyl-2,5-di(tertiary-butylperoxy) hexyne-3, etc., or irradiation on the order of 10 to 15 megarads, for example, with cobalt-60 (gamma radiation) or a linear accelerator (beta radiation).

Since the proportion of the additives, i.e., voltage stabilizer compounds, required for significant improvement in voltage stability of polyethylene are generally from about 0.1 to about 10 percent, preferably about 0.2 to 5.0 percent, by weight based on the amount of polyethylene, an important criterion limiting the usefulness of a particular additive is its solubility in polyethylene which should be 0.1 percent by weight, and preferably 0.2 percent, or greater. Addition of such voltage stabilizer additives in excess of their solubility causes their crystallization in the polyethylenes with consequent weakening of the entire structure electrically by creating physical discontinuities, and is therefore to be avoided. The addition of 0.5 weight percent of additive to polyethylene based on the amount of polyethylene provides a particularly effective insulating composition for use in high voltage power cables.

It is also desirable that the additives be such that they can be incorporated in the polyethylene without decomposition of the polyethylene or volatilization of the voltage stabilizer additive. Since temperatures on the order of 300 to 400° F. are required for successful blending of polyethylenes with other materials, the voltage stabilizer additives should preferably be liquid and should have a low vapor pressure at this temperature range. Accordingly, the stabilizers should preferably have melting points below about 500° F. and boiling points above about 300° F.

The present invention will become more apparent from the following detailed discussion thereof with reference to the accompanying drawings wherein:

DESCRIPTION OF THE PREFERRED EMBODIMENTS

Figure 1:
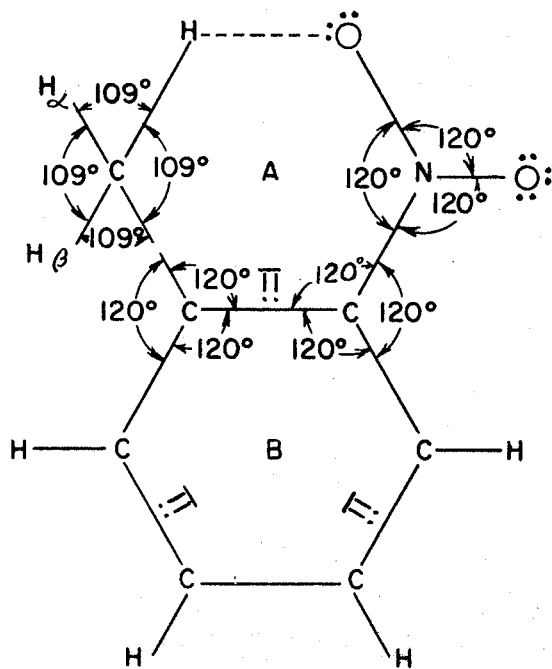
FIGS. 1–3 illustrate the processes taking place in the additive upon electron capture in the case of orthonitrotoluene (1-methyl-2-nitro benzene)

Referring now to FIG. 1, the electron acceptor of orthonitrotoluene is the nitro group, —NO₂, and the electron donor is the methyl group, —CH₃, which is in the ortho position with respect to the nitro group. All solid straight lines in FIG. 1 and also in the remaining figures, represent sigma ($\sigma$) electron pair bonds. Pi ($\pi$) bonds are represented by a pair of dots under the $\pi$. Non-bonding electron pairs are represented by a pair of dots alone or a bar. The values for the angles are approximate values. All the atoms forming rings, indicated as A and B, lie in the same plane and the rings themselves lie in nearly the same plane. Only atoms H$\alpha$ and H$\beta$ are not in this plane.

The donor and acceptor are positioned so they can form a hydrogen bond which is indicated by the broken line between the proton of the hydrogen on the methyl group and the $\pi$ bonded oxygen atom of the nitro group. This proton is potentially transferable and the transfer is reversible. The length of the "hydrogen bond" is approximately twice the length of the sigma ($\sigma$) bond between the carbon and hydrogen atoms. The structure between the acceptor and donor groups is nearly planar and the atoms in the ring A between N atom of the acceptor group and the potentially hydrogen bonded O atom of the donor group, including the intervening C atoms, are joined together by a system of alternating single and double bonds. The ring A is moreover joined to and part of a conjugated ring, namely, the benzene ring B which provides adequate size and complexity for electron capture and energy dissipation without irreversible bond rupture.

Figure 2:
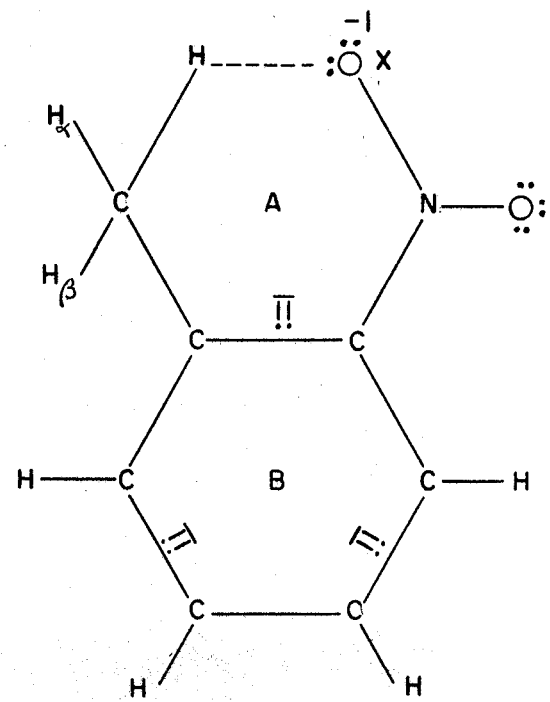

An electron falling on any part of the structure illustrated in FIG. 1 would be readily transferred by the conjugated system B to that part of the molecule possessing the highest electron affinity, namely, the nitro group and in particular, to the oxygen atom of the nitro group hydrogen bonded to the methyl group, which bond is indicated by the dashed line. FIG. 2 illustrates the skeletal structural formula of orthonitrotoluene in one of its resonance forms after capturing (accepting) the electron $x$ which has migrated to the atom having the greatest electron affinity, which in this case is the $\pi$ bonded oxygen atom in the strongest electron accepting group, the nitro-NO₂ group. The captured electron then induces the transfer of the proton of the hydrogen bond to the oxygen atom (see FIG. 3) and this in turn triggers off a redistribution of the electrons between the donor and acceptor groups via the benzene ring system B, whereupon the electron pair formerly holding the proton to the methyl group is released to form a $\pi$ bond between the carbon atoms of the former methyl group and the carbon atom of the benzene ring to which such methyl group is bonded. The original distribution of electrons in the nitro groups and benzene ring is thus replaced by only sigma bonds between the nitrogen and oxygen atoms of the nitro group, a non-bonding pair of electrons on the nitrogen atom and one of the non-bonding electrons on the carbon atom of the benzene ring joined to the nitrogen atom.

Figure 3:
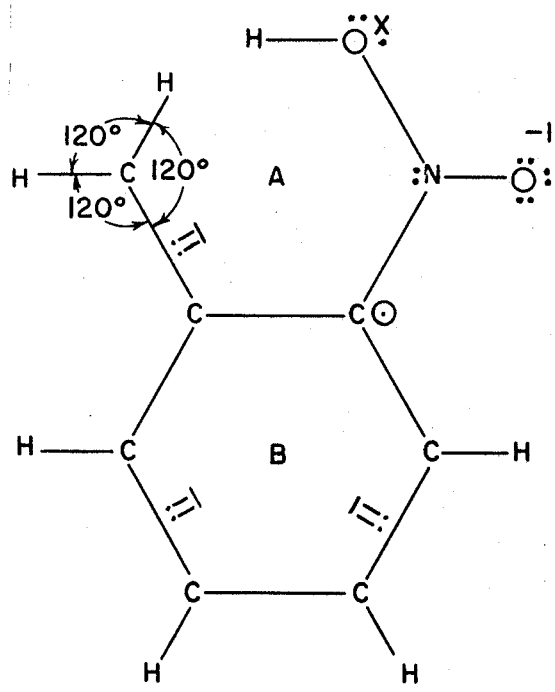
Figure 4:
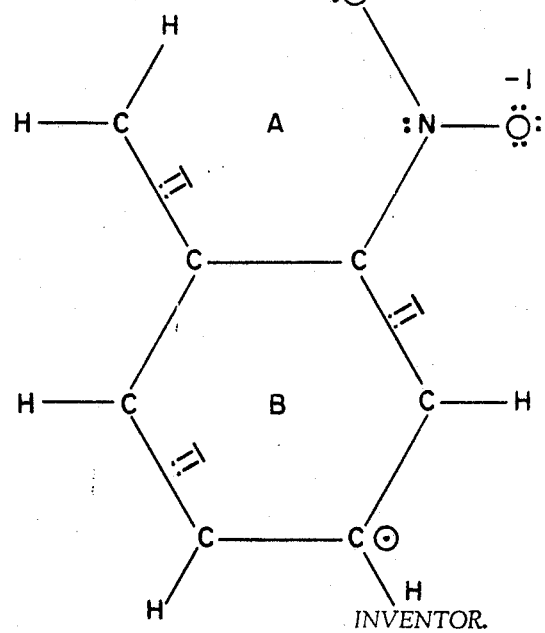
FIGS. 4–8 illustrate additional resonance forms of orthonitrotoluene after capturing the electron.
Figure 5:
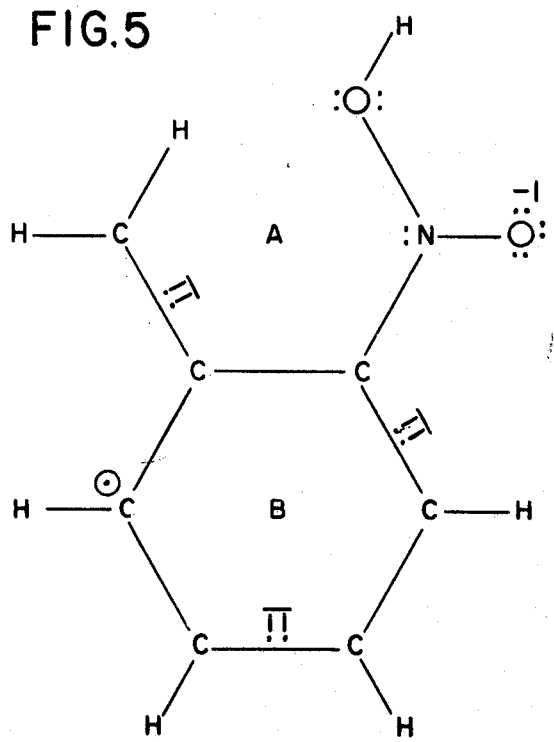
Figure 6:
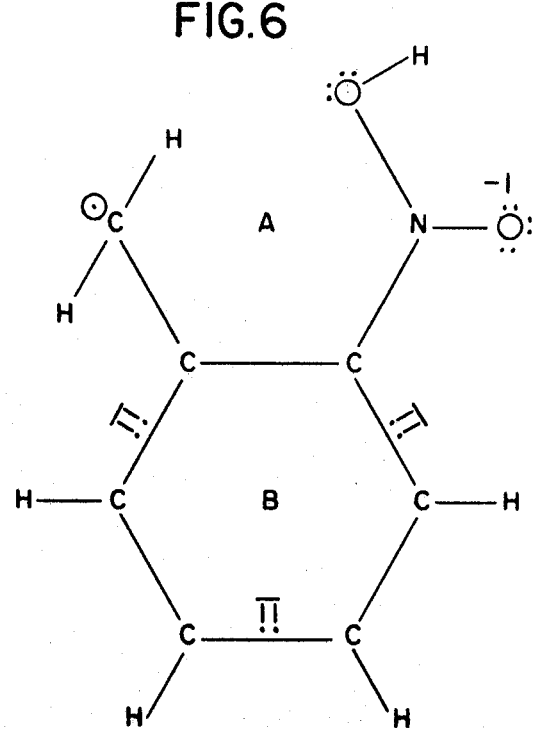
Figure 7:
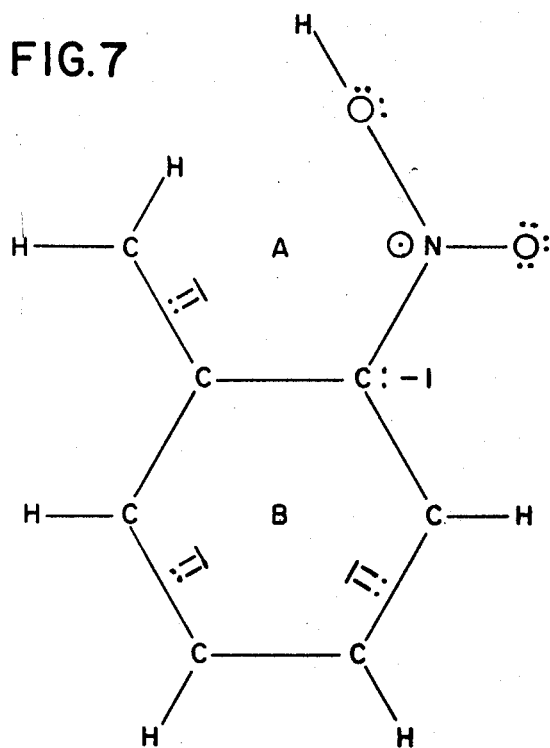
Figure 8:
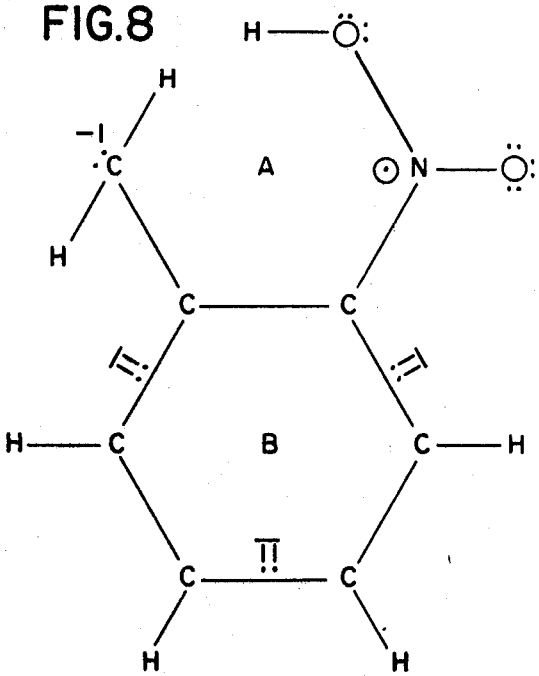

FIG. 3 thus illustrates the skeletal structure of orthonitrotoluene in one of its resonance forms after capturing the electron $x$, the subsequent shift of the proton from the methyl group to the oxygen atom of the nitro group and the redistribution of the $\pi$ electrons and the released electron pair formerly tied up in the sigma bond between the carbon atom and the transferred proton. The former methyl group has now become a planar $=CH_2$ group and the nitro group has become the strong acid group,

The residual negative charge now resides on the nitrogen or oxygen atoms. An equivalent form is one in which the $\pi$ electrons between the carbon and nitrogen atoms divide producing an unshared electron pair on the nitrogen atom and an unpaired electron on the neighboring carbon atom where it can be paired with one of the two unpaired electrons and any oxygen molecule.

The negative charge will continue to reside largely on the oxygen atoms, and the non-bonding electrons on the carbon and nitrogen atoms which are bonded together may participate in $\pi$ bonding or tie up with molecular oxygen. The eventual release of the trapped electron and the energy it has imparted to the system will allow the restoration of the whole system to its original state.

The structure and electronic distribution described above are only one of several resonance forms. FIGS. 4-8 illustrate other resonance forms of the rearranged orthonitrotoluene negative ion. Unpaired electrons are indicated by the symbol ⊙.

It is well to keep in mind with the above description that this same overall process may take place in a combination of molecules where the acceptor and donor groups, forming ring A in FIGS. 1-3, are on adjacent but separate, and possibly different, molecules. Examples of possible combinations include:

For use alone or in combination with, for example, diphenylamine—
    O-nitroaniline
    O-nitrotoluene
    2,4-dinitroaniline For use only in combination with, for example, diphenylamine—
    m-dinitrobenzene
    m-nitroaniline
    p-nitroaniline
    m-nitrotoluene
    p-nitrotoluene
    o-nitrochlorobenzene
    p-nitrochlorobenzene As may be noted, those compounds listed as for use only in combination do not fill the general requirements listed above which the additives should have and by themselves would be poor voltage stabilizers. In combination, the acceptor and donor groups of adjacent molecules bond together and form effective stabilizers. The proportion of the additives used in combination can vary; however, equimolecular proportions are preferred to provide matching between the electron acceptor and donor groups on the different additives so that the bonding may occur between adjacent but separate molecules, particularly where the arrangement of the acceptor and donor groups on the individual molecules is not such as to allow hydrogen bonding.

Other materials falling within the general description of the present invention accept an electron in a manner similar to o-nitrotoluene. Considering as an example, 2,4-dinitrotoluene, the nitro group in the 2 position can capture an electron which moves into its vicinity under the influence of the electric field in the insulation under electrical stress. This situation would then be stabilized by the exchange of a proton from the adjacent methyl group of the toluene molecule. Then, when the electron is released (at low energy), the proton returns to the methyl group and the dinitrotoluene is in its original state and can continue to function in the same way. On the basis of this hypothesis, it may be seen that 2,6-dinitrotoluene would be better as a stabilizer than 2,4-dinitrotoluene since the former has two nitro groups adjacent the methyl group, while the latter has only one so placed. The experimental data shows that this is the case. Anthranilonitrile likewise conforms to the general description of the present invention with the cyano group acting as the electron acceptor and the amino group as the proton donor. The general description of the present invention is further supported by a comparison of 2,6-dinitroaniline with 3,5-dinitroaniline and 2-nitroaniline with 3-nitroaniline wherein each case the amine group acts as the proton donor. Here again that maximum stabilizing activity is shown when the nitro groups are positioned adjacent the proton donor on the ring structure. On the basis of the general description of the present invention, it is obvious that the substitution of a nitro group on diphenylamine in a position ortho to the amino group should make a particularly effective additives and the result is exactly as predicted. Again the whole reaction is reversible and after absorbing an energetic electron and thereby helping to prevent electron avalanche formation, the stabilizer molecule releases the electron and resumes its capability to capture eletcrons.

The following examples serve to illustrate the increased voltage stability achieved with voltage stabilizers selected in accordance with the present invention without, however, limiting the same.

EXAMPLE I

A number of tests, summarized in Table I, were made to ascertain the long time voltage stability at different voltages with polyethylene solid dielectric compositions employing a polyethylene base DFD6005 (0.92 specific gravity, 0.3 melt index and including a trace of a commercial antioxidant). A series of eight samples were tested for each composition. The first series of samples tested were made of polyethylene DFD6005 without a voltage stabilizing additive. The other compositions tested contain polyethylene and 0.5 percent by weight of a voltage stabilizing additive (except as marked). All samples containing additives were prepared by mixing on a hot mill at a temperature between 325° F. and 400° F. and were identical in size and shape.

Each of the samples was subjected at room temperature to a uniform alternating current voltage and examined for evidence of high voltage breakdown in accordance with the single needle test described in "An Accelerated Screening Test for Polyethylene High-Voltage Insulation," AIEE Transactions Paper No. 62-54 (1962) by D. W. Kitchin and O. S. Pratt.

In this test a "standard defect" is used to determine the relative dielectric strength and to indicate the probable voltage life of the polyethylene insulation by inspection for "treeing," a characteristic generally accepted as an early stage of dielectric breakdown. The "standard defect" consists of a needle imbedded in a sample of polyethylene under controlled conditions. The blocks are then mounted so that the points of the needles are always the same distance from a ground plane electrode (4 inches), and the sample is stressed by applying a voltage between the needle and ground for one hour. The sample is then inspected under a microscope at 25× for detectable "trees" as evidence of electrical failure. Visible damage is rated as a failure. The voltage at which 4 out of the 8 duplicate samples tested develop "trees" in one hour is the "one-hour characteristic voltage."

The needle test has been shown to correlate well with the results of voltage life tests on wire. This is true of polyethylene with voltage stabilizing additives, as well as conventional polyethylene formulations.

EXAMPLE II

The tests of Example I were repeated using different voltage stabilizing additives and different polyethylene bases as summarized in Table II except that in the needle tests the distance between the ground plane electrode and the needle point was varied as indicated in Table II.

TABLE II

| Polyethylene Base Material | Additive | Additive Concentration, parts per 100 parts of base | Needle Spacing, Inches | Number of Failures in One Hour out of eight samples | | | | | | | |
|---|---|---|---|---|---|---|---|---|---|---|---|
| | | | | Test Voltage, kv. | | | | | | | |
| | | | | 7 | 10 | 20 | 30 | 40 | 50 | 60 | 70 |
| N-172 | N-nitroso,N-phenyl benzylamine. | .50 | 2⅞ | | | 0 | 8 | | | | |
| N-172 | N-nitroso carbazole | .20 | 2⅞ | | | | | 4 | | | |
| N-172 | N-nitroso diphenylamine | .10 | 2⅞ | | | | 5 | | | | |
| N-172 | Azobenzene | .50 | 2⅞ | | | | | 7 | | | |
| N-172 | 4-methyl-2-nitroaniline | .50 | 2⅞ | | | | 6 | | | | |
| N-172 | p-Phenyl azoaniline | .50 | 2⅞ | | | | 8 | | | | |
| N-172 | Omega-nitro styrene | .50 | 2⅞ | | | | | 0 | | | |
| N-172 | 2,2'-dinitro biphenyl | .50 | 2⅞ | | | | | 7 | 8 | | |
| V-103 | Omega-nitro stryrene | .50 | 2⅞ | | | | | 3 | 2,0 | | |
| N-172 | Blank | | 7 | | | | 6,7 | | | | |
| N-172 | do | | 2⅞ | 0 | 4 | | | | | | |
| N-121 | do | | 7 | | | | | 7,8 | | | |
| V-103 | do | | 2⅞ | | | 4 | | | | | |

TABLE I.—NUMBER OF FAILURES IN ONE HOUR OUT OF EIGHT SAMPLES

| Additive | Test Voltage, kv. | | | | | | |
|---|---|---|---|---|---|---|---|
| | 18 | 20 | 23 | 30 | 40 | 50 | 60 |
| None | 4 | | | | | | |
| 2% 2,4,6-trinitrotoluene | | | | 0 | 3 | 5 | |
| Ortho methylanisole | | 5 | | | | | |
| 2-nitro diphenylamine | | | | 0 | 0 | 0 | |
| 2,4-dinitroanisole | | 0 | | 6 | | | |
| 2-methoxy-4-nitroaniline | | 0 | | 8 | | | |
| 4-methoxy-2-nitroaniline | | 0 | | 8 | | | |
| 2,4-dinitrodiphenylamine | | | | 0 | 0 | 1 | |
| Ortho nitroanisole | | | | 0 | 0 | 2 | |
| Chloranil | | | | 3 | | | |
| 2,6-dinitrotoluene | | | | 0 | 0 | 0 | 3 |
| 2,4-dinitrotoluene (tech.) | | | | 0 | 0 | 5 | 8 |
| Do.[1] | | | | | 0 | 3 | 7 |
| Orthonitrodiphenyl | | | 0 | 0 | 3 | | |
| 2,4-dinitrochlorobenzene | | | | 4 | 7 | 7 | |
| 2-nitroaniline | | | | 0 | 5 | | |
| 3-nitroaniline | | | | 2 | | | |
| Anthranilonitrile | | | | 0 | 1 | 1 | |
| 3,5-dinitroaniline | | | | 7 | | | |
| 2,6-dinitroaniline | | | | 1 | | | |
| 1-fluoro-2-nitrobenzene | | | 0 | 0 | 3 | | |

[1] Repeated.

EXAMPLE III

The test procedure of Example II was repeated using samples in which mixtures of the voltage stabilizing additives were incorporated into the polyethylene base. The additive combinations used and the test results are summarized in Table III.

TABLE III

| Polyethylene Base Material | Additives | Additive Concentration, parts per 100 parts of base | Needle Spacing, Inches | Number of Failures in One Hour out of Eight Samples | | | | | | |
|---|---|---|---|---|---|---|---|---|---|---|
| | | | | Test Voltage, kv. | | | | | | |
| | | | | 16 | 18 | 20 | 30 | 40 | 50 | 60 |
| N-140 | None | | 7½ | 6 | 2 | 8,8,8 | | | | |
| N-140 | {Diphenylamine / 2,4-dinitrotoluene} | .25 / .25 | 7½ | | | | 0,0 | 1,4 | | |
| N-140 | {Diphenylamine / Anthranilonitrile} | .30 / .20 | 7½ | | | | | 1,1,2 | 5 | |
| N-140 | {Diphenylamine / O-nitrobiphenyl} | .25 / .25 | 7½ | | | | | 1,4,4 | | |
| N-140 | {Anthranilonitrile / 2,4-dinitrotoluene} | .20 / .30 | 7½ | | | | | 3,3,4 | | |
| N-140 | {2-nitrodiphenylamine / 2,4-dinitrotoluene} | .25 / .25 | 7½ | | | | | 7,7 | | |
| N-140 | {2-nitrodiphenylamine / Diphenylamine} | .25 / .25 | 7½ | | | | | 2,3,8 | | |
| N-140 | {O-nitroanisole / 2,4-dinitrotoluene} | .25 / .25 | 7½ | | | | | 3,7 | | |
| N-140 | {2,4-dinitrotoluene / Diphenylamine} | .17 / .33 | 7½ | | | | | 2,2 | 2,6,7 | |
| N-140 | {2,4-dinitrotoluene / Diphenylamine} | .33 / .17 | 7½ | | | | | 0,0,4 | 4,8 | |
| N-140 | {2,4-dinitrotoluene / Diphenylamine} | .10 / .40 | 7½ | | | | | 7 | 2,4,6 | |
| N-140 | {2,4-dinitrotoluene / Diphenylamine} | .40 / .10 | 7½ | | | | | 6 | 2 | |

TABLE III.—Continued

| Polyethylene Base Material | Additives | Additive Concentration, parts per 100 parts of base | Needle Spacing, Inches | Number of Failures in One Hour out of Eight Samples Test Voltage, kv. | | | | | | |
|---|---|---|---|---|---|---|---|---|---|---|
| | | | | 7 | 10 | 20 | 30 | 40 | 50 | 60 |
| N-172 | None | | 2⅞ | | 4 | | | | | |
| N-172 | 2,4,6-trinitrotoluene<br>Diphenylamine | .25<br>.25 | 2⅞ | | | | 0 | 0, 5 | | |
| N-172 | 2,4-dinitrotoluene<br>Diphenylamine | .25<br>.25 | 2⅞ | | | | 0 | 4 | | |
| N-172 | O-nitrotoluene<br>Diphenylamine | .25<br>.25 | 2⅞ | | | | 1 | | | |
| N-172 | O-nitrobiphenyl<br>Diphenylamine | .25<br>.25 | 2⅞ | | | | 3 | | | |
| N-172 | O-nitrotoluene<br>O-dinitrotoluene<br>Diphenylamine | 2.00<br>.25<br>.25 | 2⅞ | | | | | | 1 | |
| N-172 | O-nitrotoluene<br>2,4-dinitrotoluene<br>Diphenylamine | 3.00<br>.375<br>.375 | 2⅞ | | | | | | 1 | |
| N-178 | None | | 2⅞ | | | 8 | | | | |
| N-178 | O-nitrotoluene<br>2,4-dinitrotoluene<br>Diphenylamine | 2.00<br>.25<br>.25 | 2⅞ | | | | | 0 | | |
| N-172 | O-nitrotoluene<br>2,4-dinitrotoluene<br>Diphenylamine | 1.50<br>.25<br>.25 | 2⅞ | | | | | 1 | | |
| N-172 | 2,4,6-trinitrotoluene<br>2-nitrodiphenylamine | .25<br>.25 | 2⅞ | | | | 1 | | | |
| N-172 | 2,4,6-trinitrotoluene<br>2-nitroaniline | .25<br>.25 | 2⅞ | | | 0 | 8 | | | |
| N-172 | 2,4-dinitrotoluene<br>2-nitroaniline | .25<br>.25 | 2⅞ | | | | 3 | | | |
| N-172 | 2,6-dinitrotoluene<br>2-nitrodiphenylamine | .25<br>.25 | 2⅞ | | | | 4 | | | |
| N-172 | 2,6-dinitrotoluene<br>O-nitroanisole | .25<br>.25 | 2⅞ | | | 2 | 8 | | | |
| N-172 | 2,4-dinitrodiphenylamine<br>O-nitroanisole | .25<br>.25 | 2⅞ | | | 6 | 7 | | | |
| N-172 | 2-nitroaniline<br>1-fluoro-2-nitrobenzene | .25<br>.25 | 2⅞ | | | | 4 | | | |
| N-172 | 2,6-dinitroaniline<br>1-fluoro-2-nitrobenzene | .25<br>.25 | 2⅞ | | | | 0 | | | |
| N-172 | 2,4-dinitrotoluene<br>2,4-dinitrodiphenylamine | .25<br>.25 | 2⅞ | | | 0 | 8 | | | |
| N-172 | O-nitrobenzene<br>Chloranil | .25<br>.25 | 2⅞ | | | | 2 | | | |
| N-172 | O-nitrobenzene<br>2,6-dinitroaniline | .25<br>.25 | 2⅞ | | | | 5 | | | |
| N-172 | 2,4-dinitrotoluene<br>Chloranil | .25<br>.25 | 2⅞ | | | | 0 | | | |
| N-172 | O-nitrobiphenyl<br>Chloranil | .25<br>.25 | 2⅞ | | | | 2 | | | |
| N-172 | 2,4-dinitrotoluene<br>Chloranil | .25<br>.25 | 2⅞ | | | | 0 | | | |
| N-172 | Omega-nitrostyrene<br>N-nitroso diphenylamine | .25<br>.25 | 2⅞ | | | 0 | | | | |
| N-172 | N-nitroso,N-phenyl benzylamine<br>N-nitroso diphenylamine | .25<br>.25 | 2⅞ | | | 1 | | | | |

In Tables II and III the polyethylene base material designated N-140 is a commercial polyethylene composition having a density of .92, a melt index of 0.5 and including a trace (0.2 percent) of a commercial stabilizer, Santowhite crystals. Polyethylene base material designated N-172 is similar to N-140, having similar physical properties—melt index, .25—and including a small amount of a polypropylene polymer. Polyethylene base material designated N-178 is similar to N-140, having similar physical properties but having a different stabilizer, i.e., 0.07 percent diphenylparaphenylenediamine. Polyethylene base material designated N-121 is a commercial polyethylene composition having a density of .92 and a melt index of .20 to .25. Polyethylene base material designated V-103 is a commercial curable polyethyleneperoxide mixture containing 2 to 3 percent of di(alpha-cumyl) peroxide.

The improvement is in dielectric strength obtained by incorporating small amounts of the voltage stabilizing additives shown above also carry over into large scale samples made in production equipment. A number of trial runs producing long lengths of 15 kv. polyethylene insulated power cable using polyethylene containing additives of the type disclosed have been made. The results obtained from tests carried out upon samples from these production runs have been uniformly superior to the results of similar tests carried out on cables insulated with conventional polyethylene which did not contain the voltage stabilizing additives. These remarks apply particularly to voltage time tests and are most striking in the case of tests of really long duration such as the voltage life test wherein a cable sample is subject to 2½ times the normal service voltage and is held at this voltage until failure occurs. Voltage life test results for polyethylene containing the voltage stabilizing additives are greater than the corresponding results for unstabilized polyethylene by a factor of 5 or more.

EXAMPLE IV

The additives of Examples I–III exhibit voltage stability characteristics in polypropylene and polyisobutylene when admixed therewith in amounts of from about ½ to 2 percent by weight based on the amount of polyolefin used.

EXAMPLE V

To further illustrate the voltage stabilizing effect of a combination of additives, polyethylene such as used in Example I and containing ½ percent of a mixture of equal parts of 2,4-dinitrotoluene and diphenylamine was tested according to the single needle test. No failures were observed at test voltages of 50 kv. and 60 kv.

EXAMPLE VI

Additional additives which exhibit similar voltage stability in polyethylene when admixed in equimolecular proportions with diphenylamine to form a blend which is incorporated in the polyethylene in amounts of about ½ percent by weight based on the amount of polyethylene are:

| | |
|---|---|
| o-nitroaniline | p-nitroaniline |
| o-nitrotoluene | m-nitrotoluene |
| 2,4-dinitroaniline | p-nitrotoluene |
| m-dinitrobenzene | o-nitrochlorobenzene |
| m-nitroaniline | p-nitrochlorobenzene |

Examples of further additives which, in accordance with this invention, can be utilized as voltage stabilizers in admixture with one or more of the additives of Examples I–III are shown in the following table. In each example the addition compounds are blended with a polyethylene having a specific gravity of 0.92 and melt index of 0.3, including a trace of commercial antioxidant. Blending, as indicated above, is in a hot mill between 325° F. and 400° F.

| Example No. | Additive | Total Parts By Weight of Additives per 100 Parts of Polyethylene |
|---|---|---|
| VII | Phenyl-alpha-naphthylamine | .5 |
| VIII | Diphenylamine | .1 |
| IX | Phenyl-beta-naphthylamine | .5 |
| X | N,N'-diphenyl-paraphenylene diamine | .1 |
| XI | Benzidene | 1.0 |
| XII | Diparamethoxy-diphenylamine | 2 |

The polyethylene compositions described in the above table and in each of the other examples can be utilized as dielectric compositions, for example, by extrusion on wire in a conventional manner. In addition, the polyethylene compositions can also include cross-linking catalysts such that the extruded product is a cross-linked polyethylene, optionally the extruded product can be cross-linked by irradiation. In addition, the composition can contain carbon black in small amounts for use as jacketing composition for jacketing insulated cables and can contain carbon black in large amounts such that the polyethylene composition is suitable as a semi-conducting material.

What is claimed is:

1. A solid dielectric composition comprising a major amount of a solid phase polymer selected from the group consisting of polyethylene, polypropylene and polyisobutylene having dispersed therein a small, soluble voltage stabilizing amount from about 0.1 to about 10 percent of an additive selected from the group consisting of 2,4,6-trinitrotoluene; 2,4-dinitrotoluene; 2,6-dinitrotoluene; 2-nitrodiphenylamine; 2,4 - dinitrodiphenylamine; o - nitroanisole; o-nitrobiphenyl; 2-nitroaniline; anthranilonitrile; 1-fluoro-2-nitrobenzene; chloranil; 2,6-dinitroaniline; diparamethoxy diphenylamine; o-nitrotoluene; N-nitroso, N-phenyl, benzylamine; N-nitroso carbazole; N-nitroso diphenylamine; azobenzene; 4-methyl-2-nitroaniline; p-phenyl azoaniline; ω-nitro styrene; 2,2'-dinitro biphenyl and mixtures thereof, mixtures thereof with a compound selected from the group consisting of diphenylamide; phenyl alpha-naphthylamine; phenyl beta-naphthylamine; N,N'-diphenyl paraphenylene diamine and benzidene and mixtures of at least one of the aforementioned compounds with at least one of m-dinitrobenzene; m-nitroaniline; p-nitroaniline; m-nitrotoluene; p-nitrotoluene; o-nitrochlorobenzene or p-nitrochlorobenzene.

2. The composition according to claim 1 in which said additive is 2,4,6-trinitrotoluene.

3. The composition according to claim 1 in which said additive is 2,4-dinitrotoluene.

4. The composition according to claim 1 in which said additive is 2,6-dinitrotoluene.

5. The composition according to claim 1 in which said additive is 2-nitrodiphenylamine.

6. The composition according to claim 1 in which said additive is 2,4-dinitrodiphenylamine.

7. The composition according to claim 1 in which said additive is o-nitroanisole.

8. The composition according to claim 1 in which said additive is o-nitrobiphenyl.

9. The composition according to claim 1 in which said additive is 2-nitroaniline.

10. The composition according to claim 1 in which said additive is anthranilonitrile.

11. The composition according to claim 1 in which said additive is 1-fluoro-2-nitrobenzene.

12. The composition according to claim 1 in which said additive is chloranil.

13. The composition according to claim 1 in which said additive is 2,6-dinitroaniline.

14. The composition according to claim 1 in which said additive is diparamethoxy diphenylamine.

15. The composition according to claim 1 in which said additive is o-nitrotoluene.

16. The composition according to claim 1 in which said additive is N-nitroso, N-phenyl, benzylamine.

17. The composition according to claim 1 in which said additive is N-nitroso carbazole.

18. The composition according to claim 1 in which said additive is N-nitroso diphenylamine.

19. The composition according to claim 1 in which said additive is azobenzene.

20. The composition according to claim 1 in which said additive is 4-methyl-2-nitroaniline.

21. The composition according to claim 1 in which said additive is p-phenyl azoaniline.

22. The composition according to claim 1 in which said additive is ω-nitro styrene.

23. The composition according to claim 1 in which said additive is 2,2'-dinitro biphenyl.

24. The composition according to claim 1 in which said additive is a mixture of diphenylamine with at least one of m-dinitrobenzene, m-nitroaniline, p-nitroaniline, m-nitrotoluene, p-nitrotoluene, o-nitrochlorobenzene and p-nitrochlorobenzene.

25. A solid dielectric composition comprising a major amount of solid phase polymer of polyethylene having dispersed therein a small, soluble voltage stabilizing amount from about 0.1 to about 10 percent of an additive selected from the group consisting of 2,4,6-trinitrotoluene; 2,4 - dinitrotoluene; 2,6 - dinitrotoluene; 2 - nitrodiphenylamine; 2,4-dinitrodiphenylamine; o-nitroanisole; o-nitrobiphenyl; 2-nitroaniline; anthranilonitrile; 1-fluoro-2-nitrobenzene; chloranil; 2,6-dinitroaniline; diparamethoxy diphenylamine; o-nitrotoluene and mixtures thereof, mixtures thereof with diphenylamine, and mixtures of diphenylamine with at least one of m-dinitrobenzene, m-nitroaniline, p-nitroaniline, m-nitrotoluene, p-nitrotoluene, o-nitrochlorobenzene and p-nitrochlorobenzene.

26. An insulated electrical conductor adapted to carry current at a high voltage, the insulation consisting essentially of a solid phase polymer selected from the group consisting of polyethylene, polypropylene and polyisobutylene having dispersed therein a small, soluble voltage stabilizing amount of an additive selected from the group consisting of 2,4,6-trinitrotoluene; 2,4-dinitrotoluene; 2,6-dinitrotoluene; 2-nitrodiphenylamine; 2,4-dinitrodiphenylamine; o-nitroanisole; o-nitrobiphenyl; 2-nitroaniline; anthranilonitrile; 1-fluoro-2-nitrobenzene; o-nitrotoluene; diparamethoxy diphenylamine; chloranil; 2,6-dinitroaniline and mixtures thereof, mixtures thereof with diphenylamine, and mixtures of diphenylamine with at least one of m-dinitrobenzene, m-nitroaniline, p-nitroaniline, m-nitrotoluene, p-nitrotoluene, o-nitrochlorobenzene and p-nitrochlorobenzene.

References Cited
UNITED STATES PATENTS

| | | | |
|---|---|---|---|
| 2,719,182 | 9/1955 | Ross et al. | 252—63 X |
| 2,889,306 | 6/1959 | Hawkins et al. | 260—45.9 |
| 3,072,603 | 1/1963 | Tholstrup | 260—45.9 X |
| 3,166,529 | 1/1965 | Newland et al. | 260—45.9 X |
| 3,364,172 | 1/1968 | Tocker | 260—45.9 |

OTHER REFERENCES

Chemical Engineering Progress, vol. 59, No. 4, pp. 73–76, Russell, Polypropylene As an Insulation.

JOHN T. GOOLKASIAN, Primary Examiner

M. E. McCAMISH, Assistant Examiner

U.S. Cl. X.R.

174—110.44; 252—66; 260—45.9, 45.7